United States Patent [19]
Lehmann

[11] 3,967,827
[45] July 6, 1976

[54] SYNCHRONIZED INDUCTION MOTOR

[75] Inventor: Rüdiger Lehmann, St. Georgen, Black Forest, Germany

[73] Assignee: Firma Dual Gebruder Stiedinger, St. Georgen, Black Forest, Germany

[22] Filed: Apr. 11, 1974

[21] Appl. No.: 460,141

[30] Foreign Application Priority Data
Apr. 13, 1973   Germany............................ 2318728

[52] U.S. Cl. ............................. 274/1 E; 310/156
[51] Int. Cl.² .................. G11B 17/00; H02K 21/12
[58] Field of Search ........... 274/1 E, 39 R; 310/156, 310/162

[56] References Cited
UNITED STATES PATENTS

| | | | |
|---|---|---|---|
| 3,485,498 | 12/1969 | Smith | 274/39 R |
| 3,531,670 | 9/1970 | Loudon | 310/156 |

FOREIGN PATENTS OR APPLICATIONS

| | | | |
|---|---|---|---|
| 876,473 | 8/1942 | France | 310/156 |
| 1,265,217 | 5/1961 | France | 310/156 |

*Primary Examiner*—Harry N. Haroian
*Attorney, Agent, or Firm*—Ernest G. Montague; Karl F. Ross; Herbert Dubno

[57] ABSTRACT

A synchronized induction motor, designed to drive a turntable of a record player, has a stator with two pole pairs spaced 90° apart and a rotor with a short-circuited cylindrical body inductively entrainable by the alternating stator field. The rotor body is provided at one end with a magnetic ring peripherally subdivided into eight magnet poles spaced 45° apart, these poles coacting with an armature on the stator forming two pole shoes jointly magnetizable with one stator pole pair, in line therewith, and two pairs of pole shoes jointly magnetizable with the other stator pole pair, disposed midway between the stator poles. The inductive torque exerted upon the rotor with a 50% lag of the rotor is insufficient to cause further acceleration whereby the rotor is driven synchronously by the coacting pole shoes and magnet poles.

4 Claims, 3 Drawing Figures

SYNCHRONIZED INDUCTION MOTOR

The present invention relates to a synchronized induction motor having an n-pole stator forming an even number of pole pairs and an electrically short-circuited rotor body coaxial with a permanently magnetic ring having an even number of north and south poles arranged alternately on the circumference thereof.

Such motors are used, for instance, for driving phonograph-record players, since on the one hand there is required for the reproduction of sound a motor having a speed of rotation which is as constant as possible, needing only to overcome a light load, while on the other hand, in order to drive the mechanical system during a period when no reproduction takes place, a motor of high torque is required, a constant speed of rotation not being so important in this case.

In order to have the rotor enter into synchronism, the induction part must be designed for a rated speed of rotation which comes as close as possible to the synchronous speed of rotation. This, however, results in the disadvantage of a small starting torque. Furthermore, such a motor has the disadvantage that relatively narrow limits are established for the load in the synchronous speed range, since the power of the synchronous part of the motor cannot be increased at will in view of the starting behavior.

In the case of a belt drive, the uniformity of the speed of rotation depends on the ratio of the thickness of the belt to the diameter of the belt pulley. Thus, for example, the unavoidable variations in the thickness of a belt are more significant in the case of a pulley of a smaller diameter than in the case of a larger pulley. In the case of a record player the turntable of which is driven via a belt directly from the motor shaft, the speed of an 8-pole a.c. motor of 750 rpm energized at 50 Hz would be just about satisfactory in this respect. An 8-pole motor, however, is relatively expensive with respect to its inductively effective stator part.

The object of the present invention is to provide a synchronized induction motor of simplified construction and improved relationship of synchronous-speed power to starting torque.

I realize this object, in accordance with the present invention, by the provision of a rotor having an electrically short-circuited cylindrical body inductively entrainable by a rotating component of an oscillating primary magnetic field generated by the energization, with alternating current, of coil means serving for the reversible magnetization of adjacent stator poles as is well known per se. A permanently magnetic ring, coaxially secured to the rotor body, forms a multiplicity of angularly equispaced magnet poles of alternate polarities equaling twice the number of stator poles, specifically eight magnet poles in the preferred embodiment described hereinafter. A magnetically permeable armature on the stator forms a first and a second set of pole shoes respectively associated with alternate stator poles and magnetically coupled therewith for joint magnetization by the coil means, the pole shoes of the first set being substantially aligned with their associated stator poles while the pole shoes of the second set lie substantially midway between their associated stator poles and adjoining stator poles. This arrangement establishes a secondary magnetic field, rotating at half the speed of the primary field, for the synchronous entrainment of the rotor by coaction of the pole shoes with the magnet poles. With suitable construction of the coil means, the induction torque provided by the primary field is insufficient to accelerate the rotor beyond the speed of the secondary field, thereby insuring synchronous entrainment once the latter speed has been reached.

The above and other features of my invention will be described in further detail with reference to the accompanying drawing in which.

Figure 1:
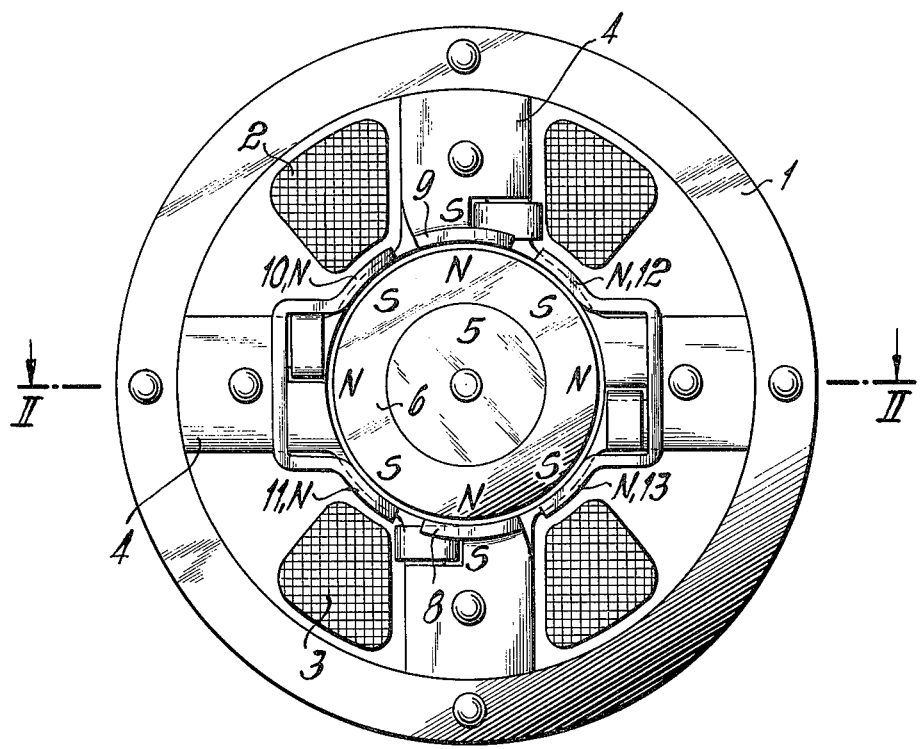
FIG. 1 is a top view of a synchronized induction motor embodying my invention.
Figure 2:
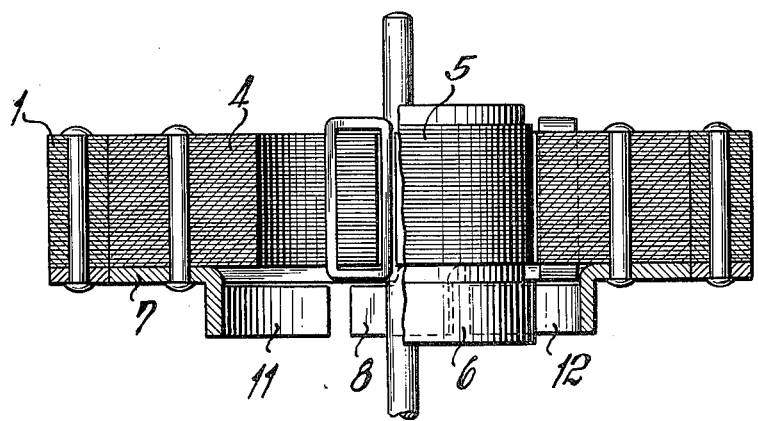
FIG. 2 is a sectional view through the motor of FIG. 1 taken on the line II — II of FIG. 1.

The drawing shows a motor 17 whose stator in part corresponds to the customary construction of a 4-pole induction-type fractional-horse-power motor with short-circuited rotor, the latter having a cylindrical body 5. In a yoke 1 of the stator, centered on an axis 0, there is inserted a cross-shaped pole structure with two pairs of diametrically opposite poles 4a, 4b and 4c, 4d spaced 90° apart, poles 4a, 4b bearing two stator coils 2, 3. On one end the rotor body 5, rigid with a shaft 18, bears an annular permanent magnet 6 which forms four pairs of peripherally equispaced poles. The stator carries a magnetically permeable armature plate 7 which is curved about the rotor axis 0 in the region of the permanent magnet 6 and has upstanding legs forming pole shoes 8 to 13; the two opposite stator poles 4a and 4b; (illustrated as south poles) are substantially in alignment with a first set of pole shoes 8, 9. In the region of the two stator poles 4c, 4d acting as north poles, the plate 7 branches out symmetrically into a second set of pole shoes 10, 11 and 12, 13 which lie in the gaps between the north poles 4c, 4d of the stator and the adjoining south poles 4a, 4b. This polarity, of course, is periodically reversed in successive half-cycles of the driving voltage applied to the coils 2 and 3. As indicated in the drawing, pole shoes 8, 9 are jointly magnetizable with the associated stator poles 4a, 4b aligned therewith whereas pole shoes 10, 11, 12, 13 are jointly magnetizable with the associated stator poles 4c, 4d which are symmetrically flanked thereby. The stator poles are also shown provided with the usual shading turns 19 determining the sense of rotation.

Figure 3:
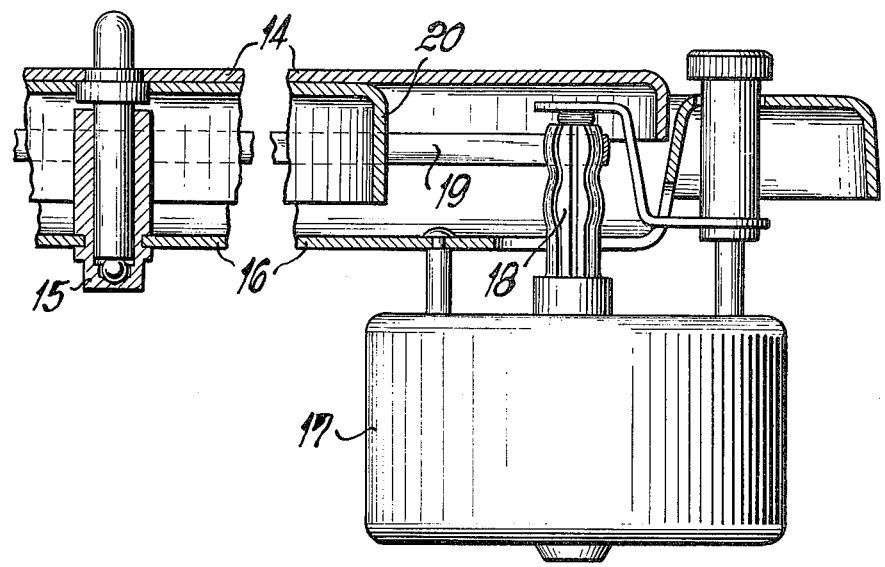
FIG. 3 is a cross-sectional view of a record player incorporating the motor of FIGS. 1 and 2.

FIG. 3 shows the use of the motor on a record player. A platter or turntable 14 is supported by means of a bearing 15 on a base plate 16 to which the motor 17 is also fastened. The motor shaft 18 is drivingly connected by a belt 19 with a sheave 20 on the underside of platter 14.

With its four stator poles, the inductive part of motor 17 has a rated speed, for an alternating voltage of 50 Hz, of about 1400 rpm, and thus a relatively high starting torque for acceleration to the aforementioned operating speed of 750 rpm. Since opposite poles of stator and rotor in the synchronous part again confront each other upon every voltage reversal after a rotation of only 45°, this establishing a synchronous speed of only 750 rpm corresponding to half the speed of the rotating vector components of the alternating stator field. Since the inductive torque in this speed range is designed not to exceed the entrainment torque of the synchronous part, the rotor cannot be accelerated above that speed. This, however, has the consequence that, in contradistinction to a conventional synchronized inductive motor of this general type, the induction torque helps drive the load even at synchronous speed.

I claim:

1. A record player having a turntable, a motor and transmission means drivingly connecting said motor with said turntable, said motor comprising:
   a stator centered on an axis and provided with an even number of pairs of diametrically opposite stator poles angularly equispaced from one another;
   coil means on said stator energizable with alternating current for reversibly magnetizing adjacent stator poles with opposite polarity, thereby generating a primary magnetic field with a vector component rotating at a predetermined speed about said axis;
   a rotor having an electrically short-circuited cylindrical body centered on said axis for inductive entrainment by said rotating component;
   a permanently magnetic ring coaxially secured to said body, said ring forming a multiplicity of angularly equispaced magnet poles of alternate polarities equaling twice the number of said stator poles; and
   magnetically permeable armature means on said stator forming a first and a second set of pole shoes respectively associated with alternate stator poles and magnetically coupled therewith for joint magnetization by said coil means, the pole shoes of said first set being substantially aligned with their associated stator poles, the pole shoes of said second set lying substantially midway between their associated stator poles and adjoining stator poles for establishing a secondary magnetic field rotating at half said predetermined speed for the synchronous entrainment of said rotor by coaction of said pole shoes with said magnet poles, said coil means being constructed and arranged to provide an induction torque insufficient to accelerate said rotor beyond the speed of said secondary magnetic field.

2. A record player as defined in claim 1 wherein the number of said stator poles is four.

3. A record player as defined in claim 1 wherein said magnetic ring is carried on one end of said body, said armature means comprising a plate curved about said axis in the region of said magnetic ring.

4. A record player as defined in claim 3 wherein said plate forms symmetrical branches terminating in pole shoes of said second set on opposite sides of their associated stator poles.

* * * * *